(12) United States Patent
Voss et al.

(10) Patent No.: US 9,892,315 B2
(45) Date of Patent: Feb. 13, 2018

(54) SYSTEMS AND METHODS FOR DETECTION OF BEHAVIOR CORRELATED WITH OUTSIDE DISTRACTIONS IN EXAMINATIONS

(71) Applicant: Sension, Inc., Palo Alto, CA (US)

(72) Inventors: Catalin Voss, Stanford, CA (US); Nicholas Joseph Haber, Montreal (CA)

(73) Assignee: Sension, Inc., Palo Alto, CA (US)

( * ) Notice: Subject to any disclaimer, the term of this patent is extended or adjusted under 35 U.S.C. 154(b) by 170 days.

(21) Appl. No.: 14/275,851

(22) Filed: May 12, 2014

(65) Prior Publication Data

US 2015/0044649 A1 Feb. 12, 2015

Related U.S. Application Data

(60) Provisional application No. 61/821,921, filed on May 10, 2013.

(51) Int. Cl.
*G06K 9/00* (2006.01)
*G09B 7/02* (2006.01)

(52) U.S. Cl.
CPC ..... *G06K 9/00335* (2013.01); *G06K 9/00315* (2013.01); *G09B 7/02* (2013.01)

(58) Field of Classification Search
CPC ..................................................... G09B 19/00
USPC .................................................. 434/236, 238
See application file for complete search history.

(56) References Cited

U.S. PATENT DOCUMENTS 5,944,530 A * 8/1999 Ho ........................... G09B 5/06
434/236

| | | | |
|---|---|---|---|
| 8,249,313 B2 * | 8/2012 | Yanagi | G06K 9/00288 |
| | | | 382/118 |
| 8,926,335 B2 | 1/2015 | Dutta et al. | |
| 2007/0048723 A1 * | 3/2007 | Brewer | G09B 7/02 |
| | | | 434/350 |
| 2010/0278384 A1 | 11/2010 | Shotton | |
| 2011/0223576 A1 | 9/2011 | Foster et al. | |
| 2012/0176220 A1 | 7/2012 | Garcia et al. | |

(Continued)

FOREIGN PATENT DOCUMENTS

| CA | 2847975 A1 | 3/2013 |
|---|---|---|
| CN | 102799893 A | 11/2012 |

OTHER PUBLICATIONS

Korman, Matus, "Behavioral Detection of Cheating in Online Examination", Lulea University of Technology, Master's Thesis, Computer and Systems Sciences Department of Business Administration and Social Sciences, Division of Information Systems Sciences, 120 pgs.

(Continued)

*Primary Examiner* — Kesha Frisby
(74) *Attorney, Agent, or Firm* — KPPB LLP

(57) ABSTRACT

Techniques for behavior detection in electronic examinations may be realized as a method including: collecting sensor data of an examinee taking an electronic examination, the sensor data including visual image data of the examinee taken over time; automatically detecting from the collected sensor data a pattern of behavior correlated with potential misconduct; and providing an alert to an administrator of the electronic examination based on the detected pattern of behavior. The techniques may further be realized as a system configured to collect visual image data of the examinee and one or more processors configured to carry out the method.

50 Claims, 9 Drawing Sheets

(56) References Cited

U.S. PATENT DOCUMENTS

| | | | |
|---|---|---|---|
| 2013/0016882 A1* | 1/2013 | Cavallini | G06K 9/629 382/117 |
| 2014/0114148 A1 | 4/2014 | Shepherd et al. | |
| 2014/0222995 A1 | 8/2014 | Razden et al. | |
| 2014/0240507 A1 | 8/2014 | Hsu et al. | |
| 2014/0242560 A1* | 8/2014 | Movellan | G09B 19/00 434/236 |
| 2014/0272882 A1 | 9/2014 | Kaufman et al. | |
| 2015/0279220 A1 | 10/2015 | Tian et al. | |

OTHER PUBLICATIONS

Mital, Parag K et al., "Clustering of Gaze During Dynamic Scene Viewing is Predicted by Motion", Cognitive Computation (2011) 3:5. doi:10.1007/s12559-010-9074-z, 3 pgs.

Santella, Anthony et al., "Robust Clustering of Eye Movement Recordings for Quantification of Visual Interest", "In Eye Tracking Research and Applications (ETRA) Symposium 2004," Department of Computer Science, Center for Cognitive Science, Rutgers University, 8 pgs.

Belhumeur, Peter N. et al., "Eigenfaces vs. Fisherfaces: Recognition Using Class Specific Linear Projection", IEEE Transactions on Pattern Analysis and Machine Intelligence, vol. 19, No. 7, Jul. 7, 1997, pgs. 711-720.

Tian, Yingli et al., "Facial Expression Recognition", Handbook of Face Recognition, pp. 487-519. Jan. 19, 2011. Retrieved from https://www.researchgate.net/publication/227031714.

Zeng, Zhihong et al., "A Survey of Affect Recognition Methods: Audio, Visual and Spontaneous Expressions", IEEE Transactions on Pattern Analysis and Machine Intelligence, vol. 31, No. 1, Jan. 7, 2009, pgs. 126-133.

* cited by examiner

SYSTEMS AND METHODS FOR DETECTION OF BEHAVIOR CORRELATED WITH OUTSIDE DISTRACTIONS IN EXAMINATIONS

CROSS-REFERENCE TO RELATED APPLICATIONS

This application claims priority to U.S. Provisional Application No. 61/821,921, filed May 10, 2013, which is incorporated by reference as though fully included herein.

TECHNICAL FIELD

This application relates generally to automated image recognition, and more specifically to real-time facial tracking and behavior recognition software.

BACKGROUND

The popularity of electronic examinations has steadily increased. Electronic examinations greatly reduce the personnel necessary to examine many examinees while allowing for increased flexibility and variability.

However, one persistent concern with examinations is misconduct, often correlated with outside distractions. For examinations to have value, assurances have to be made that examinees observe the rules of the examination. Less direct personal contact between authorities and each examinee provides less opportunity to detect misconduct.

It is therefore desirable to provide testing authorities with automated tools to help detect misconduct from examinees.

SUMMARY

Disclosed herein are systems and methods for detection of individuals' disallowed behavior in electronic examinations using a camera and computing device, such as a desktop computer or mobile device. The proposed software system enables detection of misconduct behavior, either for aiding a (third party) proctor or an examiner in uncovering such threats. The method for identifying this behavior combines face tracking, gaze tracking, and other image analysis tools that are feasible when using a typical computing device with a standard monocular camera. Analysis techniques include but are not limited to establishing metrics for face recognition, expression recognition, facial action unit recognition, and voice/sound analysis. The output from these metrics (most of which are custom-designed software implementations of this system) are passed as input to a behavior processing engine which analyzes the current and historical output in real time to identify individual threat events as well as one or more threat score, correlated with the probability of a misconduct. The behavior processing engine combines the sensory values into those scores and events through algorithms that include mathematical processing of the values, for example by applying a fitted sigmoid function to a pose value range in order to turn the threat into a smooth score between 0 and 1, and comparing the resulting process values against established thresholds.

In some embodiments, the behavior processing is parameterized and can be customized for varying exams, examiners, examinees, and proctors. For example, for certain examinations it may be appropriate for the examinee to look at material on a desk, for others the examinee may be required to stay focused on a computer screen. In some implementations, when a third party, such as a human proctor or examiner is alerted of the threat and then decides whether to classify the threat as "correct" or a "false positive," the behavior processing engine may utilize learning algorithms to fit the value of the parameters that empirically maximizes the likelihood of posing a threat if and only if such a threat would be deemed "correct" by the authority.

The automated processes described herein can be embodied in software which may be run in any suitable computing environment, and may use the hardware of examiners, examinees, or proctors. It will be understood that many distributions of processes between different systems, both locally and over one or more networks, may be used for different implementations without departing from the teachings of the invention, which may include a variety of arrangements for proctoring an electronic examination.

DETAILED DESCRIPTION

Figure 1:
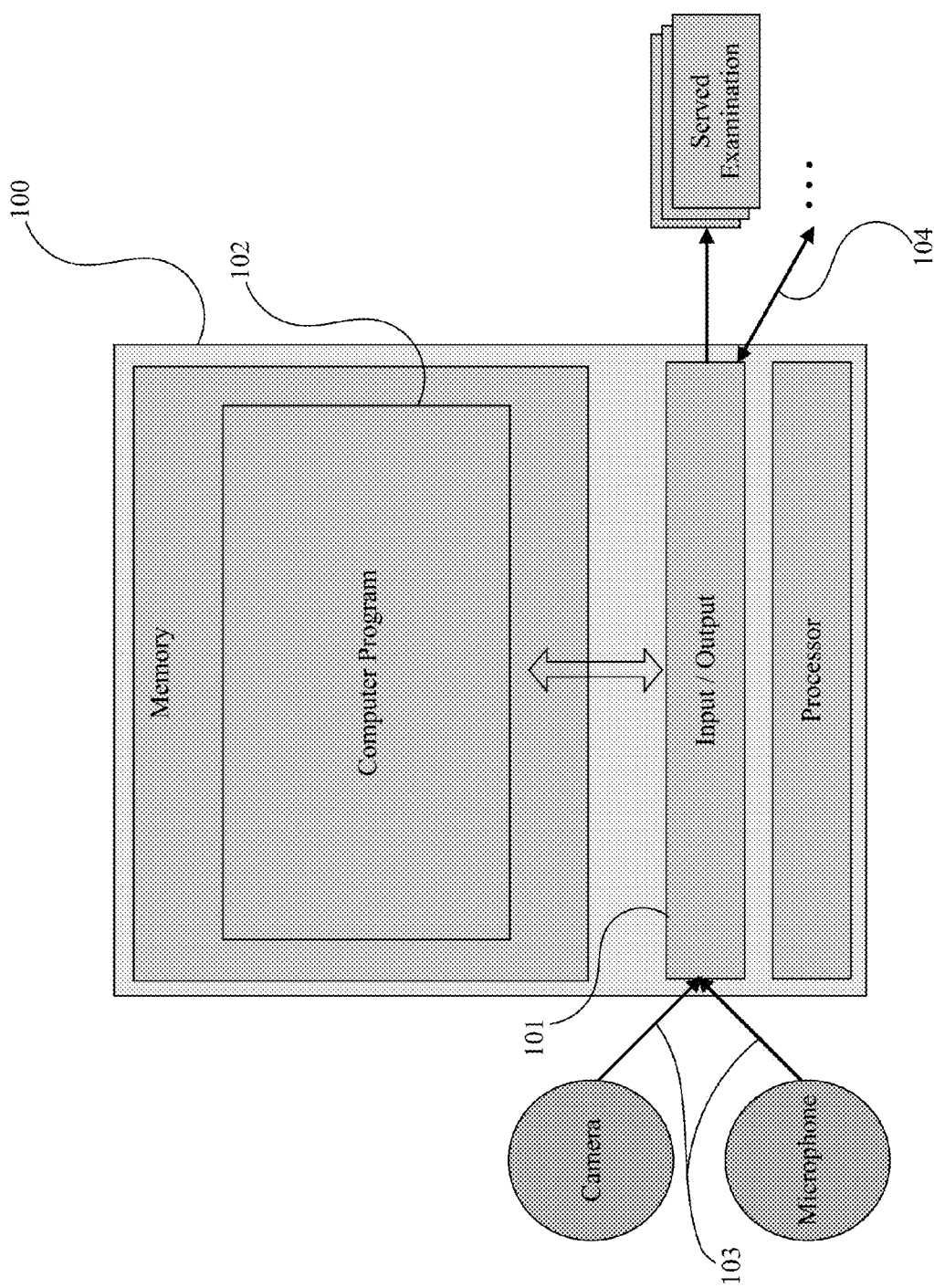
FIG. 1 is a block diagram of a computing device in accordance with an embodiment of the present disclosure.

Before describing the invention in more detail, it is appropriate to define certain terms and phrases. The term "exam" (or "examination") herein refers to an electronic medium consumed or participated in by the examinee and provided by the examiner, typically for the purpose of verification of the examinee. An exam might be purely passive for the individual or group of individuals participating ("examinee"), for example for the purpose of training the examinee through a training video, or involve participation of the examinee through writing, answering questions, etc., for example for evaluation by the examiner. An "examiner" refers to an individual or organization administering an exam, such as a university. A "proctor" is an individual or organization typically acting on the request of the examiner to ensure that no misconduct behavior occurs on an exam and to aid with other exam-related issues as required. Note that examiner and proctor may be the same individual or organization. Finally, "misconduct behavior" is behavior of the examinee that the examiner or proctor disallows or deems indicative of cheating.

The following description of the invention will first outline the technical setting that the proposed software systems and methods can be implemented in, then describe the methods used and explain the sensory components of our system. The disclosure will go on to describe the behavioral processing engine and its learning mechanisms and conclude with an outline of an exemplary implementation of the system in the examinee-to-examiner data and product flow model and further describe embodiments that are appropriate for the different settings as described.

Embodiments of the invention relate generally to a system, computer program product and computer-implemented method for determining misconduct behaviors in one or more individuals participating in an exam. To do this, the software processes historic and/or real-time data from a variety of sensors that can be connected to a user computer, such as a monocular camera and microphone. The methods described herein focus primarily on processing input from a monocular camera, but as one skilled in the art will appreciate, the proposed novel system can itself be extended by processing additional sensor input and still maintaining the processing structure described. Sensor input is processed by a program run on a computing device to apply the proposed methods and output resulting data.

As described herein, the "user computer" is the computer that interfaces with the examinee and also records sensor data of the examinee. The "user computer" many not be the only computing device involved in embodiments of the invention. In some embodiments, one or more computing devices may be involved with each user in order to administer the examination and record sensor data, while other computing devices may be involved in recording user responses to the examination, analyzing the sensor data, and communicating with examiners and proctors. Software described herein may run on hardware including any user device connected to one or more monocular cameras as a framework embedded into a client application or as a standalone application in memory.

Each computing device may comprise any type of computer known in the art, including a desktop, laptop, personal digital assistant (PDA), cellular telephone such as a Smartphone, computer tablet, networked computer display, computer server, or WebTV, as well as any other electronic device capable of interfacing with a digital camera or webcam and a user. Some computing devices, particularly user computers, may interact with sensors such as a digital camera to provide data regarding a user viewing video content. As described above, a digital camera may be any visual digital imaging device that can interact with a computer in real time (e.g., a webcam). In this regard, the user computer includes a memory having a computer program stored therein, a processor and an input/output ("I/O") device. The I/O device connects the user computer to the communications network, and optionally the camera, and can be any I/O device including, but not limited to, a network card/controller connected by a bus (e.g., PCI bus) to the motherboard, or hardware built into the motherboard to connect the user computer to the communications network or remote storage (e.g., to provide back-up for raw data collected from the webcam, training data, etc.).

The processor of each computing device executes computer programs written in memory. The processor works in conjunction with the I/O device to direct data to memory or remote storage and to send data from memory or remote storage to the processor for processing or to the communications network. The processor can be, for example, any commercially available processor, or plurality of processors, adapted for use in the user computer (e.g., Intel® Xeon® multicore processors, Intel® micro-architecture Nehalem, AMD Opteron™ multicore processors, etc.). As one skilled in the art will appreciate, the processor may also include components that allow the computing device to be connected to sensors such as a camera, as well as a display, keyboard, mouse, trackball, trackpad and/or any other user input/output device (not shown) or to view content (e.g., a graphics or video card).

The memory may store the algorithms forming the computer instructions of the instant invention and data (e.g., raw data, analyzed data, video content, etc.). As such, the memory may include both non-volatile memory such as hard disks, flash memory, optical disks, and the like, and volatile memory such as SRAM, DRAM, SDRAM, and the like, as required by embodiments of the instant invention. As one skilled in the art will appreciate, though the memory is depicted on, for example, the motherboard of the user computer, the memory may also be a separate component or device connected to the user computer (e.g., as remote storage). As such, in some embodiments, portions of the memory storing data may be implemented as network attached storage (NAS), storage area network (SAN), direct access storage (DAS), or any combination thereof, comprising, for example, multiple hard disk drives. Moreover, such data may be stored in one or more databases, tables or fields.

Turning to the drawings, FIG. 1 is a block diagram showing a user computer 100 that serves the computer program for processing where sensor input (video, audio, etc.) processed by the system comes through an I/O connection 101 on the computing device (for example a built-in or connected camera). Here, a program 102 in resident memory of the user computer 100 processes the sensor input 103 of at most one examinee. Results of the computer program may be used by other programs on the user computer, for example a secure browser application that the program is embedded in, to intervene the examination, record the output data, or transmit the data through a network connection 104 to a recipient (not shown), typically the examiner, proctor, or a third party acting for the purpose of data collection that makes such data available to examiner or proctor.

Figure 2:
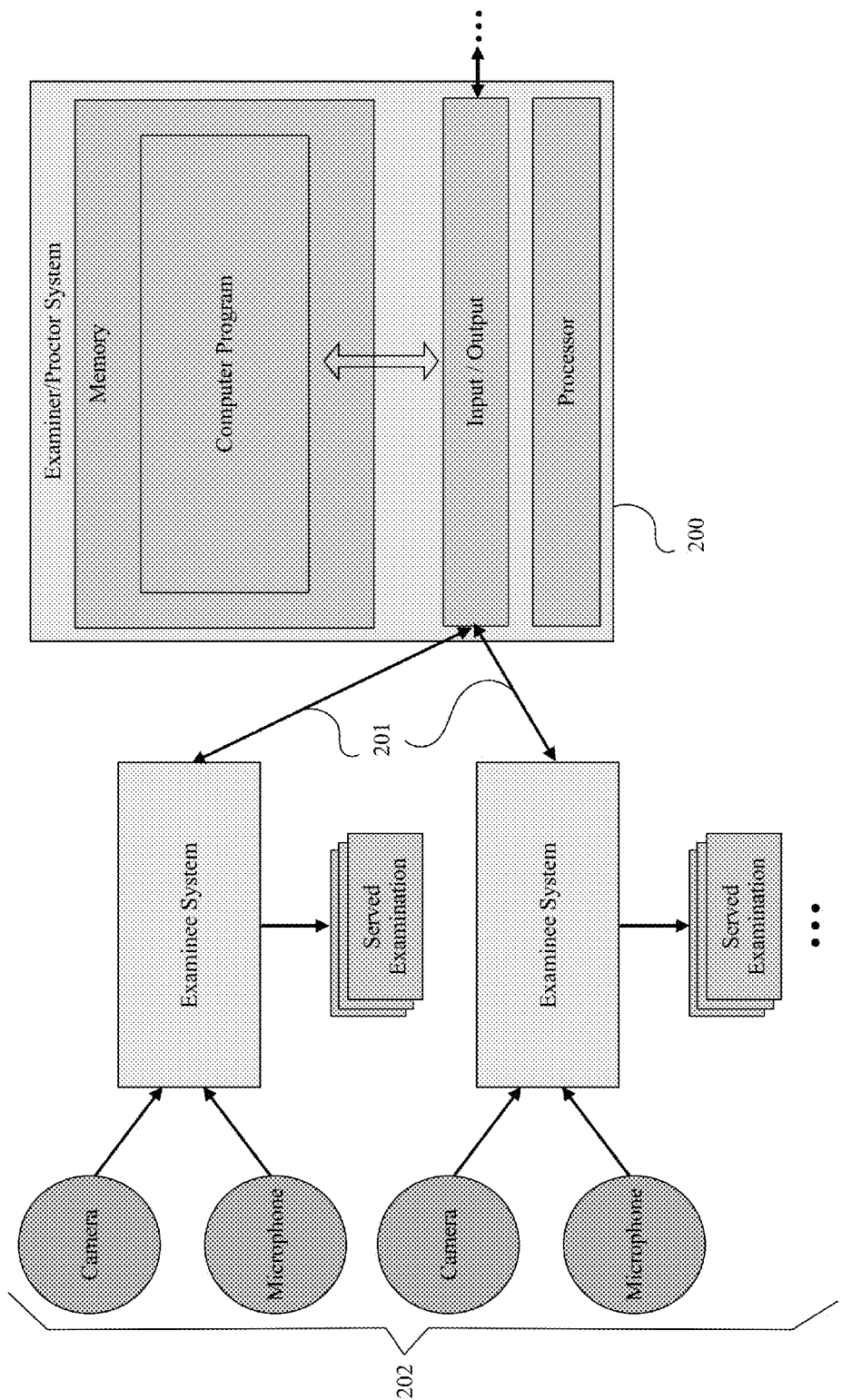
FIG. 2 is a block diagram of a computing device in accordance with another embodiment of the present disclosure.

FIG. 2 is a block diagram of an alternative system where the computer program that implements the processing steps described in this invention is not run on a user computer associated with an examinee but instead, runs on another computer 200 that aggregates sensor data from multiple examinees, typically controlled by the proctor or examiner. Each examinee computer of many 202 may itself be a user computer as described above which in turn connects to the examiner/proctor computer 200 through a network connection 201 to transmit the data collected. One may appreciate that the data transfer may not have to occur peer-to-peer but may be aggregated through a third party service.

Figure 3:
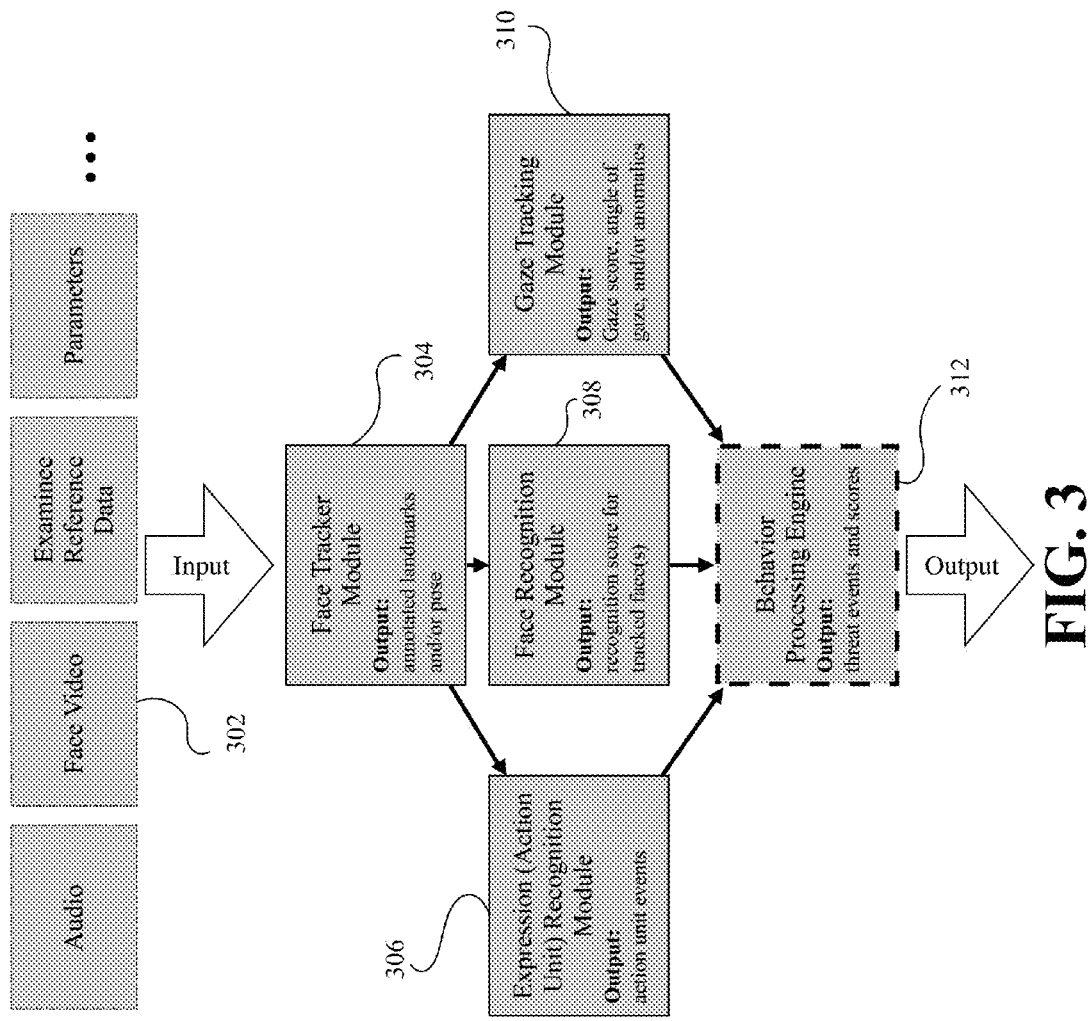
FIG. 3 is a high-level program flow diagram of an embodiment of a behavior detection system.

The system may process sensor data as illustrated in FIG. 3. As shown, video data 302 is processed in four core modules 304, 306, 308, and 310. Initially, a face tracking algorithm is applied to the input frames by a face tracker module 304. The face tracker module 304 detects one or more of bounds of faces, predefined landmarks in faces, and/or 2D/3D pose of the faces (that can be encoded, in one example, as yaw, pitch, and/or roll values or, in another example, as a rotation matrix combined with a translation vector). Output from the face tracker module 304 can be used for subsequent processing steps, including as input for further modules 306, 308, and 310.

The face tracker module 304 is primarily used to localize key points in the face required for gaze tracking and to determine the pose of the examinee. When implemented in practice on low-resolution monocular cameras, the methods presented herein benefit from falling back to a pose measure when gaze data is hard to obtain (for example, when the eyes are occluded). It is important to note that landmark localization is not a necessary step for pose estimation. Head pose can be tracked using bucketed detectors (like those of Viola & Jones presented in "Rapid Object Detection using a Boosted Cascade of Simple Features", CCVPR 2001), the cylindrical tracking model (for example La Cascia et al. "Fast, reliable head tracking under varying illumination: an approach based on registration of texture-mapped 3D models", Pattern Analysis and Machine Intelligence, IEEE Transactions on (Volume: 22, Issue: 4), 2000) or any other appropriate algorithm that computes the 2D or 3D pose in yaw pitch and roll of the head or a rotation matrix from grayscale or color texture or previously localized landmarks, like various optical flow and other approaches detailed in literature. Similarly, relevant landmarks or regions in the face can be tracked across frames using a variety of approaches. In a primitive example, eye position can be tracked using Viola & Jones based detectors that are applied to every frame. In more advanced implementations, n by n patch models learned from grayscale or color image data for various landmarks in the face can be used with a template matching algorithm (often implemented using a Fast Fourier Transform) to track key points across frames in a search window around their previous position. In that example, all key points are treated independently to generate a response map, encoding the probability of having a landmark at a particular position. This gives expected new locations for the landmarks, but simply shifting to this new location would tend to lead to nonsense very quickly, due to noise. Hence, the overall shape of the set of landmarks is constrained, parametrized by both rigid transformations and a (fairly low-dimensional) space of nonrigid deformations of the space. Given the response map, an objective function involving these constraining parameters is minimized iteratively, and then the nonrigid parameters are further clamped, restricting possible deformations so as not to get too large. This constrained space of shapes is determined through training on data: after removing rigid transformations from a data set, principal component analysis can then be applied to discover a reasonable space of nonrigid deformations. In some 2D implementations this can be done by removing shape candidates orthogonal to a subspace of shapes spanned by a set the modes. These approaches are referred to as Constrained Local Models (CLMs) in the literature. However, any other landmark localization and tracking technique would also be suitable. This includes but is not limited to CLMs, Active Shape Model based approaches (ASMs) as well as Active Appearance Models (AAMs). The face tracker is typically trained on a large database of images or videos of faces that have been annotated with the desired true values (i.e. landmarks in 2D or 3D space or pose). One embodiment of the invention uses a CLM-based tracker that localizes 68 key points in the face. The tracker's patch model is trained on a collection of grayscale face images annotated with 2D landmarks assuming a Gaussian error distribution from the center of the patch. The shape model is trained on a collection of 3D landmarks. During training, a canonical 3D shape is determined. Further, the model is bucketed for discretized poses to deal with occlusions of 3D points that occur in 2D. After training, the tracker is run on 2D face images and a 3D shape model is fitted at each iteration, thus providing estimated positions of landmarks in 3D space and an approximation of the face pose. The pose obtained from this tracking is biased towards the canonical shape found during training, but it can be used as an estimate or for initialization of a more precise pose estimation algorithm. During tracking, structure-from-motion like techniques can be employed to create a point cloud of landmarks from frames that give the same face in different poses. That point cloud can be fitted to the tracked 2D landmarks using common pose estimation algorithms like POSIT.

Figure 4:
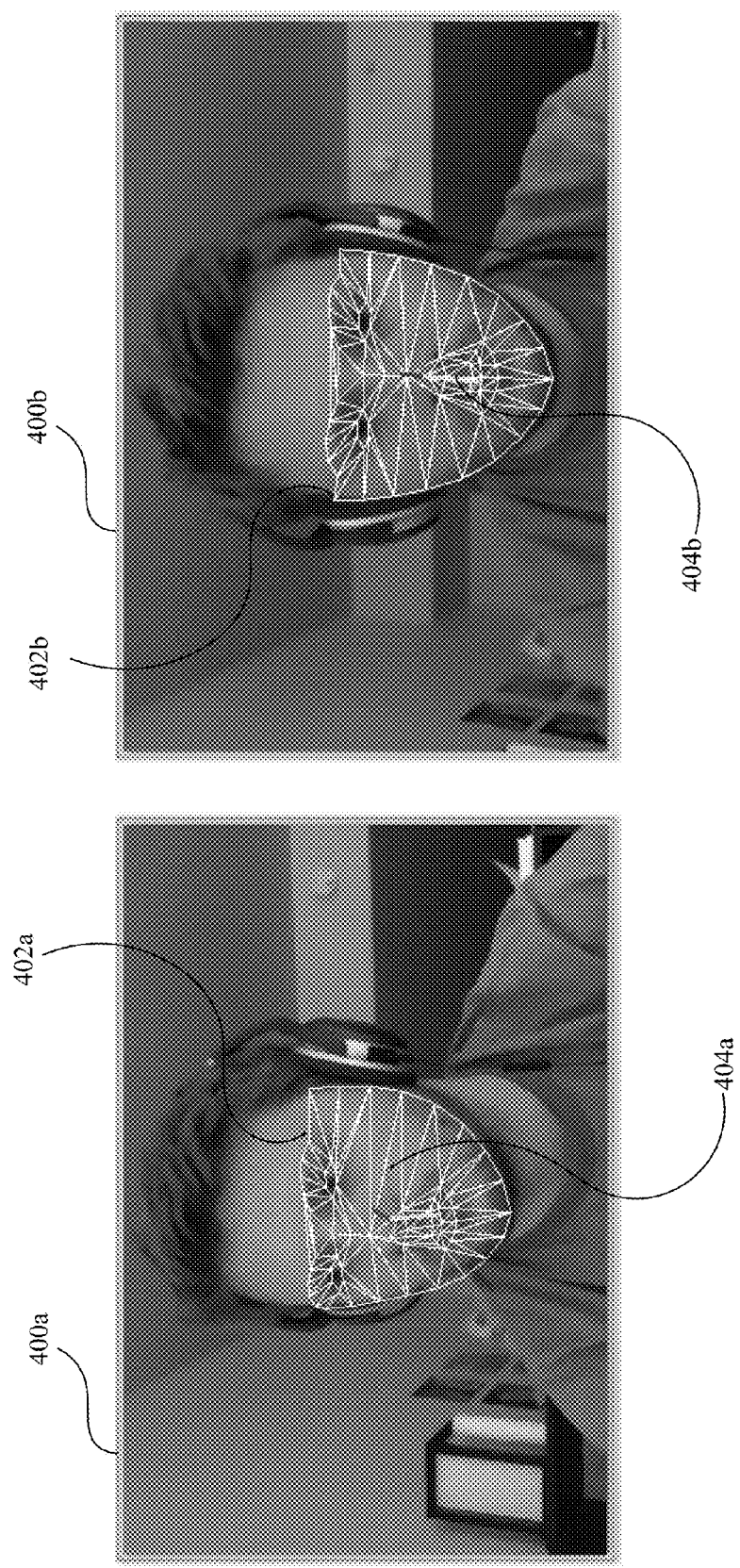
FIG. 4 is an example of a face image annotated by a 64-point tracker and its resulting pose vector.

FIG. 4 is an exemplary screenshot of the visualization of a face tracker implemented as part of this invention. Images 400a and 400b include landmarks 402a and 402b and generated pose vectors 404a and 404b. Both the landmarks 402a,b and vectors 404a,b may provide the necessary framework for carrying out the expression recognition, facial recognition, and gaze tracking processes as further described herein.

Returning to FIG. 3, an expression recognition module 306 detects expression events by processing speech, facial expressions, or their underlying facial action units, for example based on the Facial Action Coding System (FACS; proposed by Ekman & Friesen in "Facial Action Coding System: A Technique for the Measurement of Facial Movement", Consulting Psychologists Press, Palo Alto, 1978) that categorizes movement of muscles in the face, that may be relevant to further processing; for example, the module can use landmarks located by the face tracker to determine when an examinee is talking, which may in a later step be interpreted as misconduct behavior.

Based on landmarks localized in the face tracking step and/or the bounds of the face located, expression recognition methods can be employed to detect pre-defined facial action units in texture and/or landmarks. Action units may follow a specification such as the FACS and make up parts of an expression. Action units may also be custom defined values that aim to uncover facial events indicative of misconduct behavior, including for example talking and winking signals.

Expressions can be detected directly or determined from multiple detected action units. Either can be detected deterministically using geometrical or texture-based methods. For example, in some implementations, "talking" may be identified by directly thresholding large velocity or distance measures of upper and lower lip landmarks moving apart and together.

Alternatively, the expressions or action units can be determined using machine-learning methods on texture and/or landmarks. Texture-based approaches can be realized by relying on common computer vision features such as SIFT and HOG and applying common classifiers such as Linear Discriminant Analysis (LDA), Support Vector Machines (SVM), and/or Random Forest Trees, or by employing data-driven methods without significant preprocessing, such as Neural Networks; many suitable approaches are detailed in Tian et al.'s survey "Facial Expression Recognition", Handbook of Face Recognition, Springer-Verlag London Limited 2011, as well as countless individual pieces in the literature, such as Zeng et al.'s summary that describes both audio- and visual face-data driven approaches, "A Survey of Affect Recognition Methods: Audio, Visual, and Spontaneous Expressions", Pattern Analysis and Machine Intelligence, IEEE Transactions on, vol. 31, no. 1, 2009. For the purpose of identifying misconduct behavior, one does not need to achieve highest-accuracy hidden affect recognition but identify those expressive events that are correlated with misconducts. In one embodiment of the module, SIFT or other quantifiable image features are computed around key points in the mouth area and a multi-class SVM with RBF-kernel is trained on positive and negative examples of action units including "talking." During tracking, the SVM outputs binary values for each action unit. Different algorithms and classifiers can be used for different expressions and/or action units. Outputs from these algorithms, such as the distance of a new example from the separating hyperplane in an SVM, may be interpreted by the methods as confidences for individual expressions and, along with expression labels, used as output of the expression recognition module.

A face recognition module 308 can verify the identity of tracked faces by validating with cognitive signatures or reference images. A variety of well-known facial recognition techniques can be used, and the face recognition module 308 may periodically supply a score which compares imaging data to reference data and estimates a probability that the face currently recorded by the sensor is the same as the face of the examinee, particularly where the presence of any individual other than the examinee at the user computer could be indicative of misconduct behavior.

The identity of tracked faces may be verified in a facial recognition module 308 for the purposes of (a) continuous identity verification and (b) identifying misconduct behavior occurring from switching of the examinee. In one embodiment of the system, different face recognition algorithms may be employed for (a) and (b). Simple approaches known in the literature as fisherfaces or eigenfaces (well known in the literature through Belhumeur et al.'s paper "Eigenfaces vs. Fisherfaces: recognition using class specific linear projection", Pattern Analysis and Machine Intelligence, IEEE Transactions on (Volume: 19, Issue: 7), 1997) are appropriate to verify that the tracked face did not change in an interval of frames when speed is more important than. For (a), more complex algorithmic approaches driven by both cognitive features uncovered from landmarks and texture features available to common face recognition techniques can be used to verify examinee identity against a comparison photo. More complex approaches such as recent works on neural networks are also appropriate. As one skilled in the art may appreciate, one can trade off performance for more complex approaches depending on the level of security required.

A gaze tracking module 310 implements algorithms specifically applicable to the eye regions of tracked faces in order to identify a number of relevant values. For example, based on a localization of an examinee's eye region, the gaze tracking module computes a gaze score, angle of gaze, and/or gaze anomalies.

In processing a new frame from video input, the first step is to compute an estimated position of the examinee's pupil position is computed in reference to the cropped frame. One can note that at this stage, various optional verification steps have been omitted for explanation; for example one embodiment of the invention applies a Viola & Jones based trained eye detector to verify that eyes are clearly visible before initializing the gaze tracking process (even when landmarks have been provided by the face tracker) and reports an error if the tracked face has eyes covered (for example by sunglasses).

Many methods for pupil detection from eye pictures in the regular and infrared lighting setting are known to those skilled in the art. The proposed system utilizes any combination of such methods, including but not limited to ellipse fitting, thresholding, and edge detection, as well as gradient based local search and maximization algorithms. In practice, the module is best implemented as a hybrid approach of multiple algorithms that fall back to others if individual components fail, in particular in the flexible lighting setting. In one embodiment, the method combines one or more of (a) pupil center localization through maximization of the dot product of gradient vectors with the unit vector originating at the center (further described in U.S. Provisional Application No. 61/821,921 and the computer vision literature), (b) pupil position and pupil coverage (by eyelids) estimation through key points tracked by the face tracker where the pupil and surrounding points are treated like all other landmarks, (c) ellipse fitting to a canny-edge map and/or thresholded gradient of the eye region, and (d) adaptive and/or non-adaptive thresholding on the eye region.

Output from these algorithms is combined with a linear weighting, where certain methods are excluded if a failcheck step determined that they were not suitable, to determine an estimated direction of gaze. Using a geometric algorithm that takes as input the direction of gaze as well as landmarks and pose from face tracking, the angle between the gaze vector and the camera direction vector can be estimated. Various complex approaches can be employed to achieve high accuracy in estimating this result in the monocular setting, but also in particular when infrared lighting or multiple cameras are available. A sufficiently simple approach for the purposes of misconduct detection, however, is to treat the eye region as planar surface and obtain the gaze direction by adding the pose vector going out of the face to an estimated gaze vector going out of the eye with a weight (a static 3D reconstruction for the missing coordinate given the 2D vector from eye center to pupil center is appropriate). The linear weighting that achieves the optimal value in the resulting system can be obtained using camera calibration. A large value for this angle can be used as indicative of off-screen distractions. This is an integral part of the method in one embodiment of the invention, but alternative techniques for gaze tracking may fall back to other measures. In particular in another embodiment of the invention, the ratio of major to minor axis of the ellipse fit around the limbus around the iris can acts as an indicator of pupil orientation and thus gaze direction in challenging lighting or video resolution settings.

All of the algorithms described can be cross-validated across both eyes to establish accuracy requirements for any one particular algorithm (in both position and velocity of position using historic data). This error-checking can be implemented as a weighted operation, for example such that one eye's extreme gaze direction results can be enough to raise a threat or result in a threat-indicating gaze score, where the weighting may be parameterized like other components of the system described herein. In some implementations, gaze tracking accuracy can be improved by capturing high-resolution video that includes infrared sensing and shining infrared light onto the examinee. The resulting gaze direction estimation, gaze angle estimation, individual pupil position estimates, and/or any other scores (for example the ratio result of an ellipse fit) are accessible as output of the gaze tracking module 310 for further processing.

As illustrated in FIG. 3, input from the expression recognition module 306, face recognition module 308, and gaze tracking module 310 may be processed in a behavior processing engine 312 that combines these output values and their histories to identify an overall threat score and individual component threat scores that are correlated with misconduct behavior as well as threat events that reveal information about the type and location of the misconduct. In some implementations, the behavior processing engine 312 may also take input directly from the face tracker module 304; it will also be understood that implementations of the system may include fewer than all of the modules 304, 306, 308, 310 without departing from the teachings herein.

Further referring to FIG. 3, output from the expression recognition module 306, face recognition module 308, and gaze tracking module 310 is combined and used by a behavior processing engine 312 to uncover and report misconduct behavior. Other data, such as output from the face tracker module 304, or from other modules such as object or scene recognition modules (not shown), may also be used in establishing metrics and identifying behavior to report. Parameterized scoring functions are applied to numeric input scores such as a yaw/pitch/roll score from the face tracker, recognition confidence from the face recognition module, expression recognition confidence from the expression recognition module, and gaze direction, angle, and scores from the gaze tracker.

In one embodiment of the invention, parameterized sigmoid functions are used to turn a variable output value (such as a particular angle of the pose vector, say yaw) x into a continuous score S(x):

$$S(x) = \frac{a}{1 + e^{-bx}}$$

where a and b are model parameters chosen such that $S(x) \in (0,1)$. Generally, applying parameterized thresholds on such scores to identify threats gives one component of the behavior processing engine. Further, counters, duration trackers, and summers may be used to aggregate historical information. Thresholding on counters of thresholds and sums of scores as well as durations of potential violations gives a second component of behavior processing. One should note that threats identified from different scores may result in different threat events reported; for example an expression threat may be explicitly highlighted as "disallowed talking."

To improve robustness of individual scores and allow for further detection, the behavior processing may measure directional velocity of scores and utilize this to detect anomalies. For example, if one or more of the face tracking or gaze tracking components fails to register a certain pose or gaze because the face has moved beyond an established range, the behavior processing engine can measure velocity of the score leading up to a loss of tracking and then assume that the state and direction (for example, user turned to left side) persists until tracking resumes. To illustrate anomaly detection with an example, directional velocity of pupil movement that deviates from historic data (such as a determined mean gaze angle for a particular user) may lead to a detected gaze threat even if other gaze scores do not pass threat thresholds.

Figure 8:
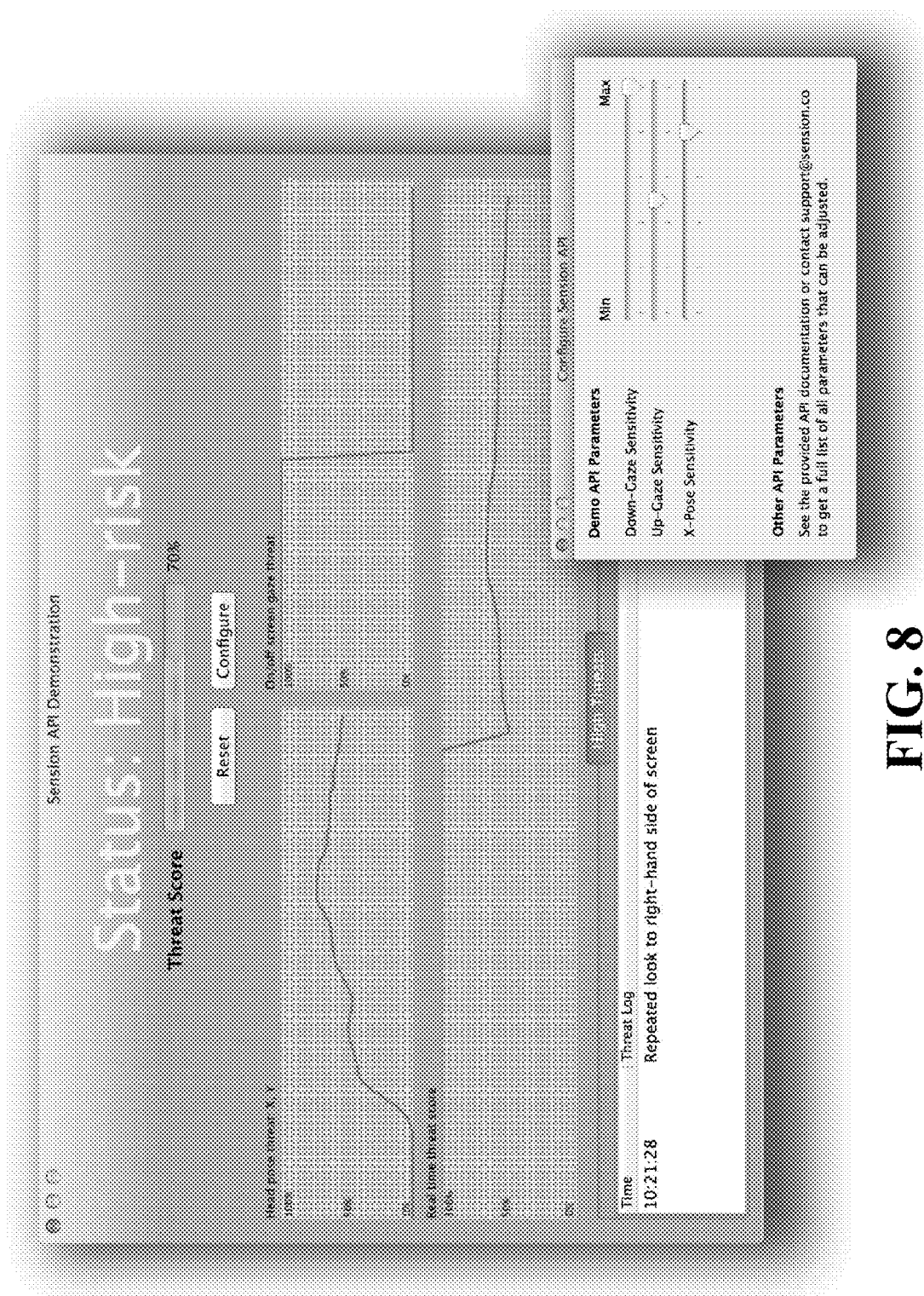
FIG. 8 is a screenshot of the user interface for a tool that allows proctors or examiners to analyze threats reported after processing by the systems and methods in real time and adjust parameters of the behavior processing engine and other systems.

The behavior processing engine 312 can further include algorithms to uncover the locality of outside distractions that may be identified as misconduct behavior and limit reported threats to those occurring in a sensitive locality (parameterized as described earlier). Referring to FIG. 8, in one embodiment of the invention, the engine may sample gaze data computed to determine areas of repeated distraction. In the planar field of view illustrated from top and bottom, predicted gaze samples denoted by "o" are deemed harmless by the system while samples denoted by "x" are deemed potential misconduct behavior. Employing supervised or unsupervised clustering algorithms, the engine can detect when repeated distractions occur in a certain field of view and conclude in the example of FIG. 8 of a threat in the "bottom right" area relative to the camera and/or screen. Additionally, areas in the 2D and/or 3D field of view may be parameterized as allowed or disallowed, thus enabling reporting of relevant threats only.

Although many of the examples used herein assume that the image data of the examinee will come generally from the "front," in the same direction where the computer monitor and the examination content is relative to the examinee, it will be understood that the setup and orientation of an electronic exam may vary. The position of the camera in relation to the exam content may vary for different applications. Nonetheless, the above processes and modules apply to image data in which a different camera position is available for monitoring the examinee.

Figure 6:
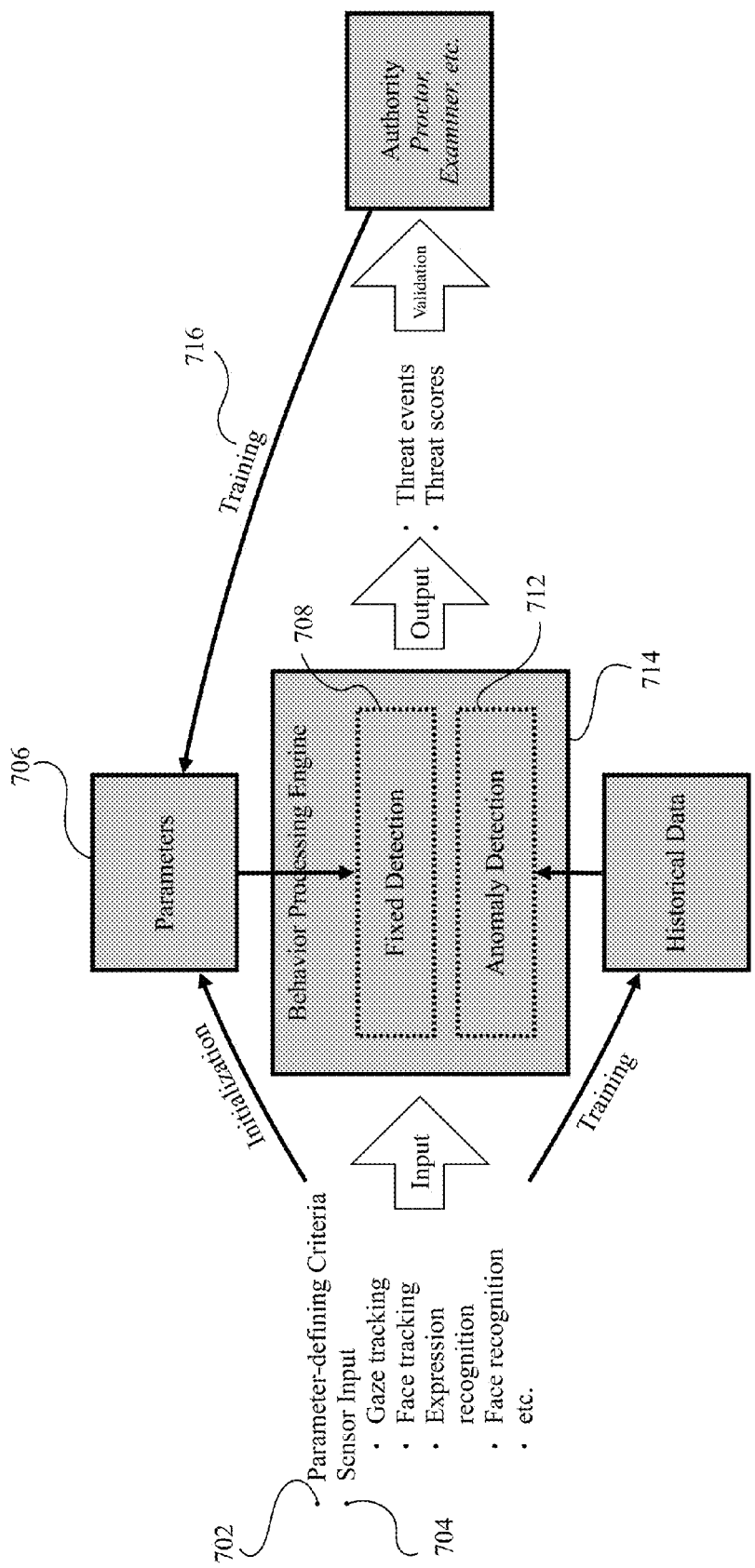
FIG. 6 is a high-level program flow diagram that illustrates the learning process of the behavior processing engine described that combines the sensor values analyzed into threat events and scores.
Figure 7:
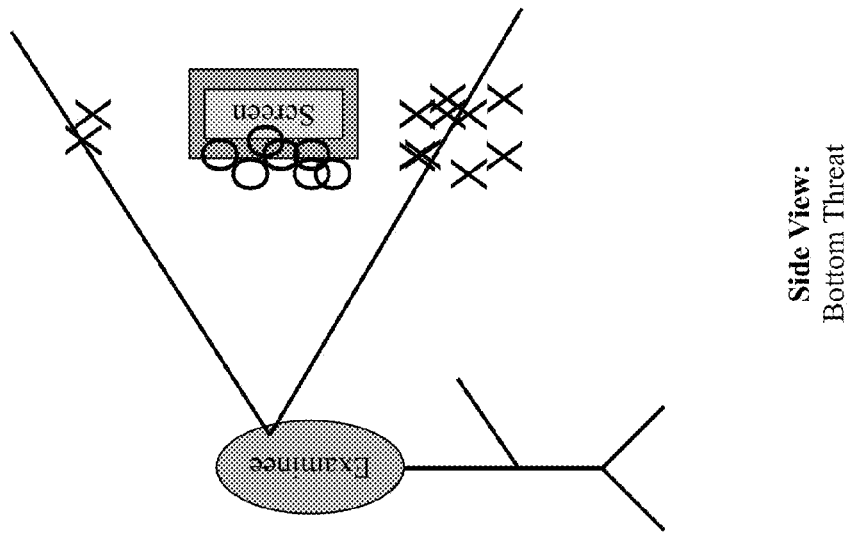
FIG. 7 is a high-level program flow diagram that describes an embodiment of the gaze tracking system proposed.
Figure 7:
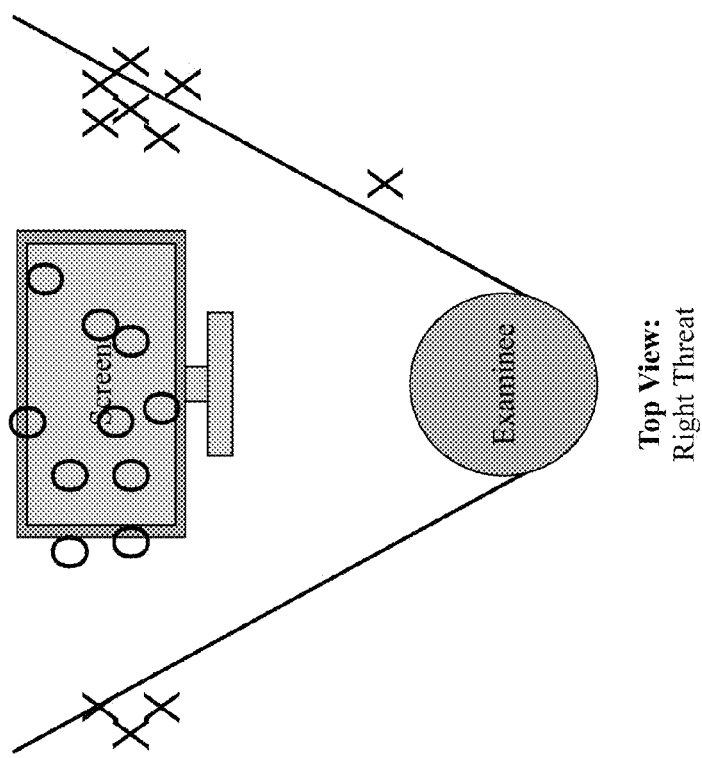

In some implementations, the behavior processing engine 312 may take advantage of multiple types of in-place learning. Referring to FIG. 6, both parameter-defining criteria 702 and sensor input 704 may be included as input for the behavior processing engine 714 (which may be equivalent to 312 as described herein). The criteria 702 may be used at initialization to establish parameters 706. The parameters 706 in turn may aid in fixed detection programs 708 for the behavior processing engine 714/312. The input 704 may further be used in live training, which may co-occur with tracking and behavior processing, to update historical data 710 for use in anomaly detection 712. It will be understood that anomaly detection requires training of normality bounds which is done in-place from the sensory input.

A further feedback loop comes from validation of the decisions 716 made by an authority based on the threats estimated and predicted by the engine 714/312. As the initialized parameters described previously for thresholding and scaling of scores and other functions are customizable, an additional training step is employed in an embodiment of the invention where an external authority, such as a proctor or examiner, verifies a reported misconduct or threat. The "true value" decision made by the authority can be used as input to a learning algorithm that formally aims to maximize agreement on threats between the system and authority. The decisions 716 can be used as training for the parameters 706. In one embodiment of this method, a local search algorithm is implemented to empirically fit the parameters post initialization for a certain proctor group. Additionally any previously discussed underlying components such as face tracking and gaze tracking may take advantage of in-place learning.

Having analyzed the sensor data, misconduct threats are typically made available to the proctor or examiner in real time or through a communications platform. In one embodiment of the invention, individual scores are combined into a live ("current") threat score as well as an aggregate total threat score that incorporates historical information through a linear weighting as well as timed biases, for example that causes the total threat score to lower slowly over time when the examinee returns to a stable state.

Figure 5:
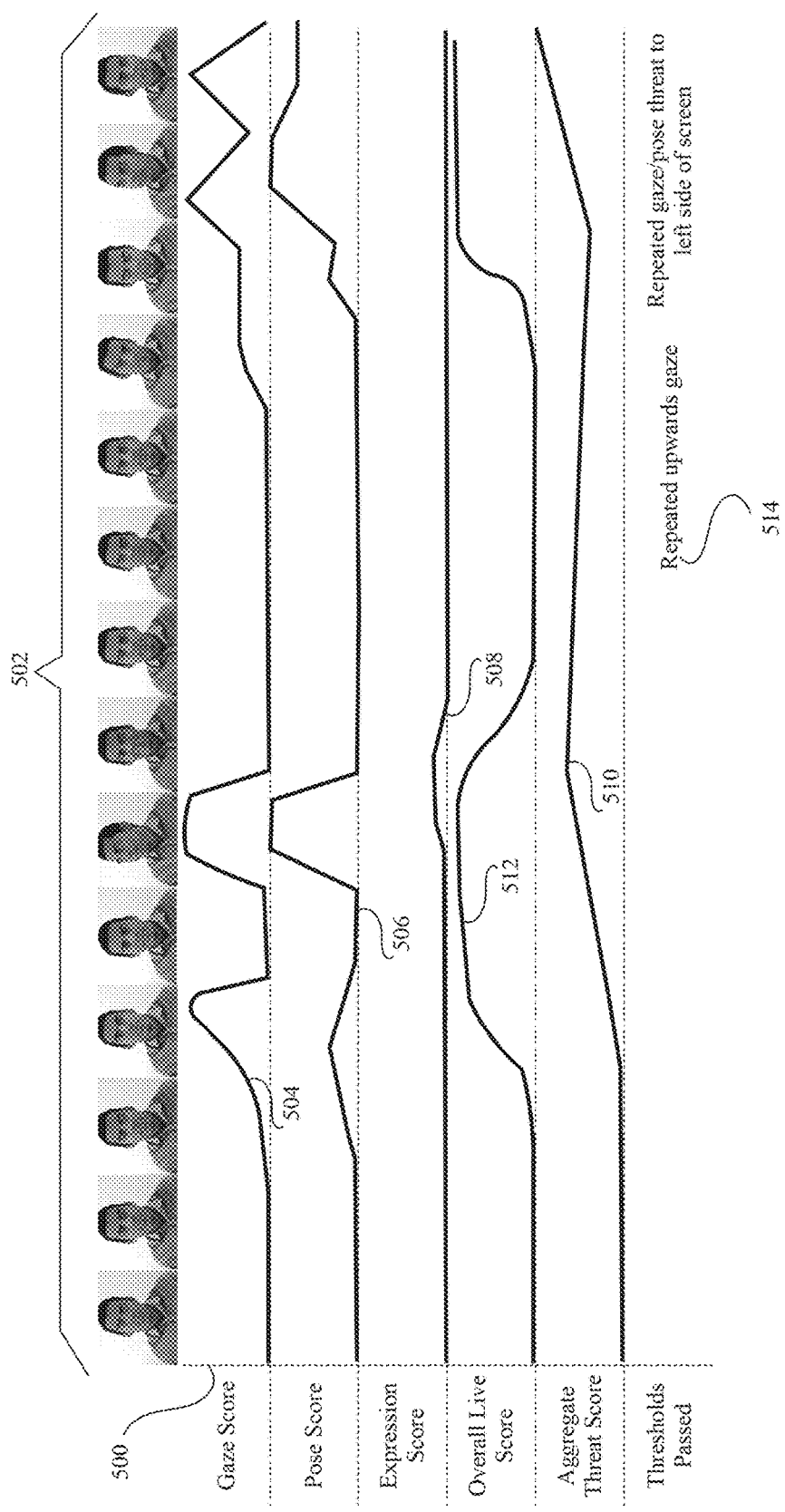
FIG. 5 is a visualization of data taken from an implementation of an embodiment of the system that shows multiple faces as seen from a monocular camera mounted on the examinee's computing device and their live threat score components for various threats that are analyzed by the system with fixed parameters for exemplary purpose.

Exemplary output of this processing in an exam session is depicted in FIG. 5. An threat score output chart 500 shows a series of thumbnail snapshots 502 of an examinee over time. A gaze score 504, pose score 506, and expression score 508 are aggregated into an overall live score 512. An aggregate threat score 510 may reflect, for example, a mean of the overall threat score over time; in some implementations, the aggregate threat score 510 may be weighted towards more recent live score values so as to preference newer anomalies over older ones. When one or more thresholds are passed by specific scores or by the aggregate threat score 510, or when other tracked anomaly events occur as described previously, an alert may be sent to a proctor and/or examiner; examples of events that triggered alerts are shown in row 514.

Without limiting any of the forgoing, at a high level, the system can be provided as (a) a standalone solution for examinee proctoring and thereby include an external reporting functionality for examiners or as (b) an integration with an existing remote proctoring application, for example by inclusion of an application framework into a secure browser an examinee uses to take an exam or by analyzing remote video and audio signals sent from the examinee to the examiner or proctor. In either case, the examiner can act as the proctor. Multiple embodiments of the software are applicable to both scenarios, including but not limited to the following exemplary embodiments.

Figure 9:
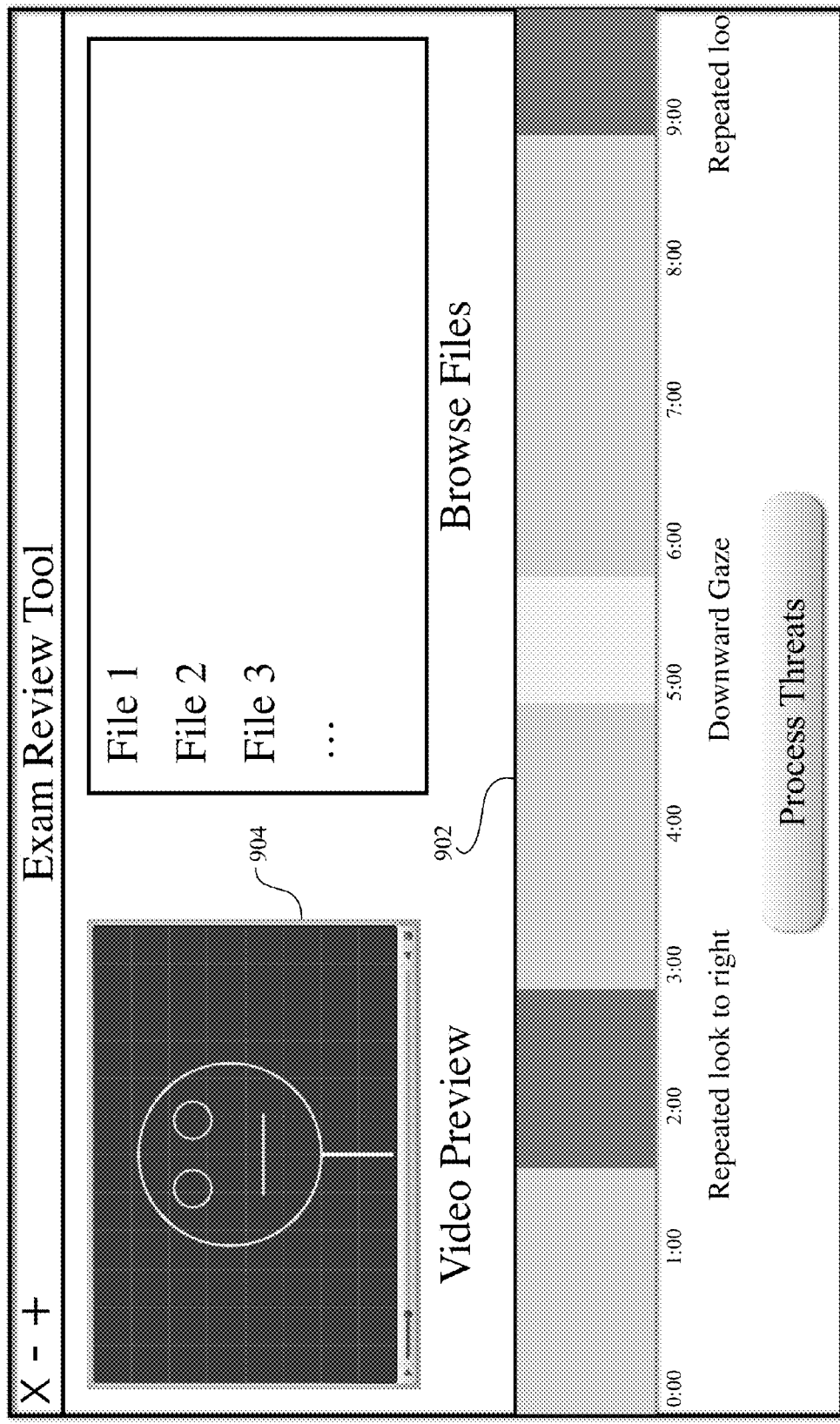
FIG. 9 is a diagram of the user interface for a tool that allows proctors or examiners to analyze threats reported after processing by the systems and methods after the exam has concluded.

FIG. 9 depicts an illustration of a user interface screenshot 900 for utilizing the proposed system to analyze previously recorded data. A timeline 902 marks locations where the behavioral analysis identified questionable events. The proctor can review the video 904, using the timeline 902 as a guide, and make determinations as to whether identified threats represent genuine misconduct or are false positives.

Referring to FIG. 8, in another embodiment of a standalone solution, the proposed system may be integrated into and delivered as part of an exam software the examiner makes available to the examinee. The examiner may process video and other data in real time through an application programming interface (API) or graphical user interface (GUI). FIG. 8 shows a screenshot of a GUI of the real time data that would be accessible through an API. In one embodiment of the system, a proctor or examiner could use such an API/GUI to focus on examinees with a higher threat score and customize behavior processing parameters for different examinees.

It should be clear that the foregoing methods described may occur independently or in one combined system without the explicit isolation at a programming level. At every step a machine-learned method is mentioned, a discrete, parameterized version thereof may be appropriate.

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

What is claimed is:

1. A computer-implemented method, comprising:
collecting sensor data of an examinee taking an electronic examination, the sensor data including visual image data of the examinee taken over time;
analyzing the collected sensor data, wherein analyzing the sensor data includes at least one of:
using one or more face tracking modules to track an examinee's face orientation and pose to generate a pose score,
using one or more expression recognition modules to identify events wherein the examinee's expression changes generating an expression score,
using one or more face recognition modules to continually match the image to images of the examinee, and
using one or more gaze tracking modules to generate at least one of a gaze score, direction of gaze measurement, and gaze anomaly measurement;
converting the collected data into a plurality of behavioral scores, each behavioral score based on an automated analysis of the collected data and selected from the group consisting of:
a gaze score generated from one or more gaze tracking modules;
a pose score generated from one or more face tracking modules; and
an expression score generated from one or more expression recognition modules;
automatically detecting from the collected sensor data a pattern of behavior correlated with potential misconduct wherein a pattern of behavior comprises identifying at least one of the behavioral scores exceeding a predefined threshold value; and
providing an alert to an administrator of the electronic examination based on the detected pattern of behavior.

2. The method of claim 1, further comprising:
receiving input from the test administrator indicating whether the pattern of behavior represents actual misconduct; and
modifying one or more parameters of a behavior detection process associated with the computer-implemented method based on the received input from the test administrator.

3. The method of claim 1, wherein the potential misconduct is consulting disallowed aids.

4. The method of claim 1, wherein the electronic examination is presented by a computing device, and wherein the visual image data is recorded by a monocular camera as a component of the computing device.

5. The method of claim 1, wherein the collected sensor data includes additional sensor data other than the visual image data, the additional sensor data taken by a sensor other than a visual image sensor.

6. The method of claim 5, wherein the additional sensor data is an audio signal obtained from a microphone.

7. The method of claim 1, further comprising:
utilizing the output of the at least one or more face tracking modules as in input to at least one of:
expression recognition process;
face recognition process; and
gaze tracking process.

8. The method of claim 1, wherein the analyzing the collected sensor data includes at least two of:
   using one or more face tracking modules to track an examinee's face orientation and pose to generate a pose score,
   using one or more expression recognition modules to identify events wherein the examinee's expression changes generating an expression score,
   using one or more face recognition modules to continually match the image to images of the examinee, and
   using one or more gaze tracking modules to generate at least one of a gaze score, direction of gaze measurement, and gaze anomaly measurement.

9. The method of claim 1, wherein the analyzing the collected sensor data includes at least three of:
   using one or more face tracking modules to track an examinee's face orientation and pose to generate a pose score,
   using one or more expression recognition modules to identify events wherein the examinee's expression changes generating an expression score,
   using one or more face recognition modules to continually match the image to images of the examinee, and
   using one or more gaze tracking modules to generate at least one of a gaze score, direction of gaze measurement, and gaze anomaly measurement.

10. The method of claim 9, further comprising:
    receiving input from the test administrator indicating whether the pattern of behavior represents actual misconduct; and
    modifying one or more parameters of a behavior detection process associated with the computer-implemented method based on the received input from the test administrator.

11. The method of claim 1, wherein the analyzing the collected sensor data includes all of:
    using one or more face tracking modules to track an examinee's face orientation and pose to generate a pose score,
    using one or more expression recognition modules to identify events wherein the examinee's expression changes generating an expression score,
    using one or more face recognition modules to continually match the image to images of the examinee, and
    using one or more gaze tracking modules to generate at least one of a gaze score, direction of gaze measurement, and gaze anomaly measurement.

12. The method of claim 11, further comprising:
    receiving input from the test administrator indicating whether the pattern of behavior represents actual misconduct; and
    modifying one or more parameters of a behavior detection process associated with the computer-implemented method based on the received input from the test administrator.

13. At least one non-transitory processor readable storage medium storing a computer program of instructions configured to be readable by at least one processor for instructing the at least one processor to execute a computer process for performing the method as recited in claim 1.

14. A system, comprising:
    a camera configured to collect visual image data of an examinee; and
    one or more processors;
    a memory directed to store a behavior detection application;
    wherein the behavior detection application configures the one or more processors to:
       present an electronic examination to the examinee;
       automatically detect, from sensor data collected by the camera during the electronic examination, a pattern of behavior comprising identifying at least one behavioral score exceeding a predefined threshold value correlated with potential misconduct wherein:
          the sensor data collected by the camera is analyzed using at least one of:
             one or more face tracking modules to track an examinee's face orientation and pose,
             one or more expression recognition modules to identify events wherein the examinee's expression changes significantly,
             one or more face recognition modules to continually match the image to images of the examinee, and
             one or more gaze tracking modules to generate at least one of a gaze score, direction of gaze measurement score, and gaze anomaly measurement score; and
       convert the collected data into a plurality of behavioral scores, each behavioral score based on an automated analysis of the collected data and selected from the group consisting of:
          a gaze score generated from one or more gaze tracking modules;
          a pose score generated from one or more face tracking modules; and
          an expression score generated from one or more expression recognition modules;
       provide an alert to an administrator of the electronic examination based on the detected pattern of behavior.

15. A computer-implemented method, comprising:
    collecting sensor data of an examinee taking an electronic examination, the sensor data including visual image data of the examinee taken over time;
    analyzing the collected sensor data, wherein analyzing the sensor data includes at least one of:
       using one or more face tracking modules to track an examinee's face orientation and pose to generate a pose score,
       using one or more expression recognition modules to identify events wherein the examinee's expression changes generating an expression score,
       using one or more face recognition modules to continually match the image to images of the examinee, and
       using one or more gaze tracking modules to generate at least one of a gaze score, direction of gaze measurement, and gaze anomaly measurement;
    converting the collected data into a plurality of behavioral scores, each behavioral score based on an automated analysis of the collected data and selected from the group consisting of:
       a gaze score generated from one or more gaze tracking modules;
       a pose score generated from one or more face tracking modules; and
       an expression score generated from one or more expression recognition modules;
    automatically detecting from the collected sensor data a pattern of behavior correlated with potential misconduct wherein:

a pattern of behavior comprises identifying at least one of the behavioral scores exceeding a predefined threshold value; and the predefined threshold value can be adjusted by the administrator of the electronic examination based on testing conditions; and providing an alert to an administrator of the electronic examination based on the detected pattern of behavior.

16. The method of claim 15, further comprising:
receiving input from the test administrator indicating whether the pattern of behavior represents actual misconduct; and
modifying one or more parameters of a behavior detection process associated with the computer-implemented method based on the received input from the test administrator.

17. The method of claim 15, wherein the potential misconduct is consulting disallowed aids.

18. The method of claim 15, wherein the electronic examination is presented by a computing device, and wherein the visual image data is recorded by a monocular camera as a component of the computing device.

19. The method of claim 15, wherein the collected sensor data includes additional sensor data other than the visual image data, the additional sensor data taken by a sensor other than a visual image sensor.

20. The method of claim 19, wherein the additional sensor data is an audio signal obtained from a microphone.

21. The method of claim 15, further comprising:
utilizing the output of the at least one or more face tracking modules as in input to at least one of:
expression recognition process;
face recognition process; and
gaze tracking process.

22. The method of claim 15, wherein the analyzing the collected sensor data includes at least two of:
using one or more face tracking modules to track an examinee's face orientation and pose to generate a pose score,
using one or more expression recognition modules to identify events wherein the examinee's expression changes generating an expression score,
using one or more face recognition modules to continually match the image to images of the examinee, and
using one or more gaze tracking modules to generate at least one of a gaze score, direction of gaze measurement, and gaze anomaly measurement.

23. The method of claim 15, wherein the analyzing the collected sensor data includes at least three of:
using one or more face tracking modules to track an examinee's face orientation and pose to generate a pose score,
using one or more expression recognition modules to identify events wherein the examinee's expression changes generating an expression score,
using one or more face recognition modules to continually match the image to images of the examinee, and
using one or more gaze tracking modules to generate at least one of a gaze score, direction of gaze measurement, and gaze anomaly measurement.

24. The method of claim 23, further comprising:
receiving input from the test administrator indicating whether the pattern of behavior represents actual misconduct; and
modifying one or more parameters of a behavior detection process associated with the computer-implemented method based on the received input from the test administrator.

25. At least one non-transitory processor readable storage medium storing a computer program of instructions configured to be readable by at least one processor for instructing the at least one processor to execute a computer process for performing the method as recited in claim 15.

26. A computer-implemented method, comprising:
collecting sensor data of an examinee taking an electronic examination, the sensor data including visual image data of the examinee taken over time;
analyzing the collected sensor data, wherein analyzing the sensor data includes:
using one or more face tracking modules to track an examinee's face orientation and pose to generate a pose score,
using one or more expression recognition modules to identify events wherein the examinee's expression changes generating an expression score,
using one or more face recognition modules to continually match the image to images of the examinee, and
using one or more gaze tracking modules to generate at least one of a gaze score, direction of gaze measurement, and gaze anomaly measurement;
automatically detecting from the collected sensor data a pattern of behavior correlated with potential misconduct; and
providing an alert to an administrator of the electronic examination based on the detected pattern of behavior.

27. The method of claim 26, further comprising:
receiving input from the test administrator indicating whether the pattern of behavior represents actual misconduct; and
modifying one or more parameters of a behavior detection process associated with the computer-implemented method based on the received input from the test administrator.

28. The method of claim 26, wherein the pattern of behavior represents a user repeatedly looking away from an electronic examination display.

29. The method of claim 28, wherein the pattern of behavior represents a user repeatedly looking at a particular location outside of the electronic examination display.

30. The method of claim 26, wherein the pattern of behavior represents talking.

31. The method of claim 26, wherein the potential misconduct is consulting disallowed aids.

32. The method of claim 26, wherein the electronic examination is presented by a computing device, and wherein the visual image data is recorded by a monocular camera as a component of the computing device.

33. The method of claim 26, wherein the collected sensor data includes additional sensor data other than the visual image data, the additional sensor data taken by a sensor other than a visual image sensor.

34. The method of claim 26, wherein the additional sensor data is an audio signal obtained from a microphone.

35. The method of claim 26, further comprising:
converting the collected data into a plurality of behavioral scores, each behavioral score based on an automated analysis of the collected data and selected from the group consisting of:
a gaze score generated from one or more gaze tracking modules;

a pose score generated from one or more face tracking modules; and an expression score generated from one or more expression recognition modules;

wherein automatically detecting a pattern of behavior comprises identifying at least one of the behavioral scores exceeding a predefined threshold value.

36. The method of claim 35, wherein the predefined threshold value can be adjusted by the administrator of the electronic examination based on testing conditions.

37. The method of claim 26, further comprising:
utilizing the output of the at least one or more face tracking modules as in input to at least one of:
expression recognition process;
face recognition process; and
gaze tracking process.

38. At least one non-transitory processor readable storage medium storing a computer program of instructions configured to be readable by at least one processor for instructing the at least one processor to execute a computer process for performing the method as recited in claim 26.

39. A computer-implemented method, comprising:
collecting sensor data of an examinee taking an electronic examination, the sensor data including visual image data of the examinee taken over time;
analyzing the collected sensor data, wherein analyzing the sensor data includes:
using one or more face tracking modules to track an examinee's face orientation and pose to generate a pose score,
using one or more expression recognition modules to identify events wherein the examinee's expression changes generating an expression score,
using one or more face recognition modules to continually match the image to images of the examinee, and
using one or more gaze tracking modules to generate at least one of a gaze score, direction of gaze measurement, and gaze anomaly measurement;
automatically detecting from the collected sensor data a pattern of behavior correlated with potential misconduct;
providing an alert to an administrator of the electronic examination based on the detected pattern of behavior
receiving input from the test administrator indicating whether the pattern of behavior represents actual misconduct; and
modifying one or more parameters of a behavior detection process associated with the computer-implemented method based on the received input from the test administrator.

40. The method of claim 39, wherein the pattern of behavior represents a user repeatedly looking away from an electronic examination display.

41. The method of claim 39, wherein the pattern of behavior represents a user repeatedly looking at a particular location outside of the electronic examination display.

42. The method of claim 39, wherein the pattern of behavior represents talking.

43. The method of claim 39, wherein the potential misconduct is consulting disallowed aids.

44. The method of claim 39, wherein the electronic examination is presented by a computing device, and wherein the visual image data is recorded by a monocular camera as a component of the computing device.

45. The method of claim 39, wherein the collected sensor data includes additional sensor data other than the visual image data, the additional sensor data taken by a sensor other than a visual image sensor.

46. The method of claim 39, wherein the additional sensor data is an audio signal obtained from a microphone.

47. The method of claim 39, further comprising:
converting the collected data into a plurality of behavioral scores, each behavioral score based on an automated analysis of the collected data and selected from the group consisting of:
a gaze score generated from one or more gaze tracking modules;
a pose score generated from one or more face tracking modules; and
an expression score generated from one or more expression recognition modules;
wherein automatically detecting a pattern of behavior comprises identifying at least one of the behavioral scores exceeding a predefined threshold value.

48. The method of claim 47, wherein the predefined threshold value can be adjusted by the administrator of the electronic examination based on testing conditions.

49. The method of claim 39, further comprising:
utilizing the output of the at least one or more face tracking modules as in input to at least one of:
expression recognition process;
face recognition process; and
gaze tracking process.

50. At least one non-transitory processor readable storage medium storing a computer program of instructions configured to be readable by at least one processor for instructing the at least one processor to execute a computer process for performing the method as recited in claim 39.

* * * * *